March 5, 1957  T. P. SMITH  2,784,399
SOUND PRODUCING FISH LURE
Filed April 23, 1956
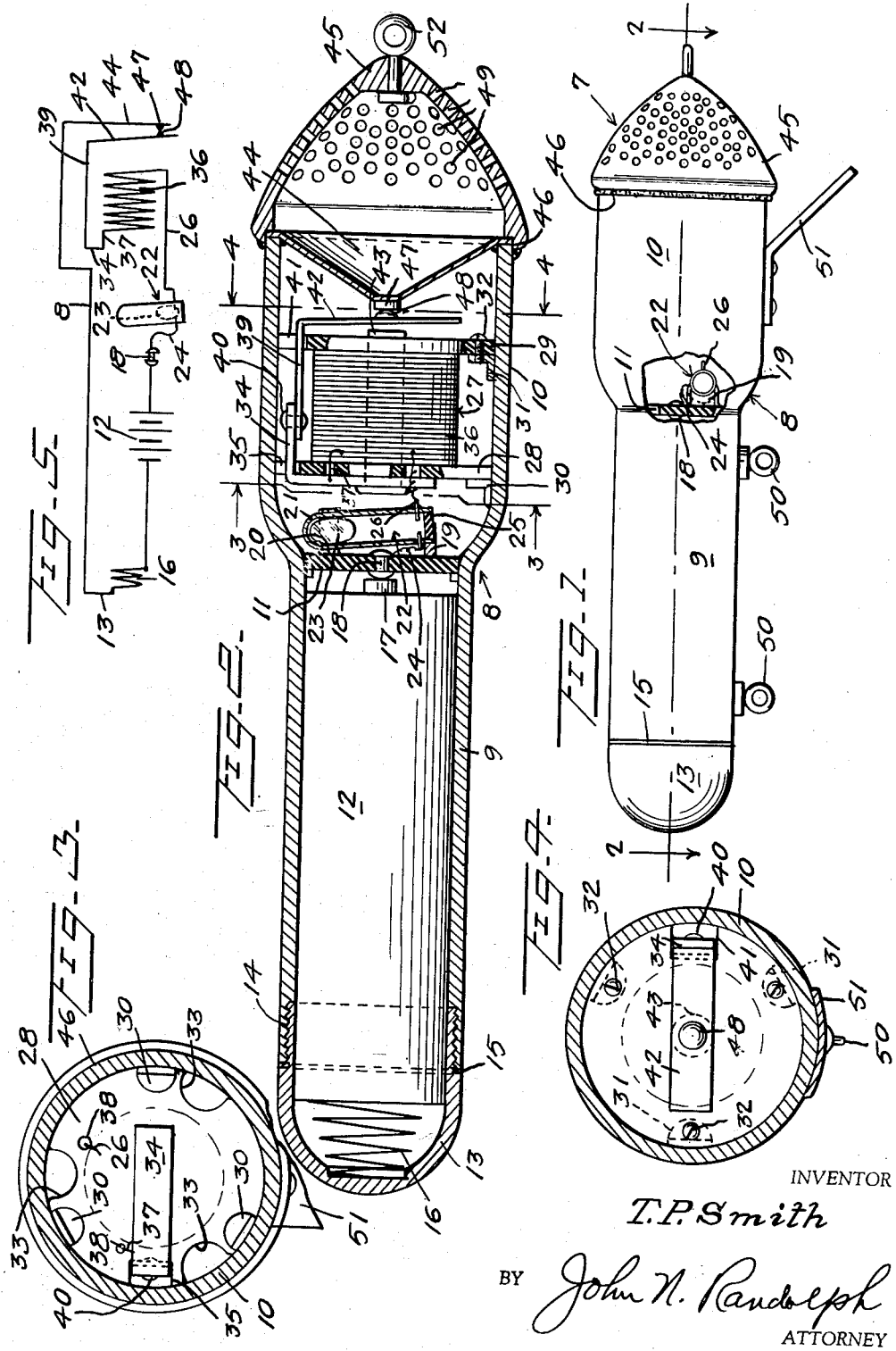
INVENTOR
T. P. Smith
BY John N. Randolph
ATTORNEY

United States Patent Office 2,784,399
Patented Mar. 5, 1957

2,784,399

SOUND PRODUCING FISH LURE

Thomas P. Smith, Pewee Valley, Ky.

Application April 23, 1956, Serial No. 579,889

4 Claims. (Cl. 340—394)

This invention relates to a novel lure which, while in use underwater, will produce a buzzing sound for attracting fish thereto.

More particularly, it is an aim of the present invention to provide a sound producing lure including a sound producing element which is in contact with the water, so that sounds produced will be readily transmitted through the water.

A further object of the invention is to provide a sound producing lure actuated by an electric current and including an inertia responsive switch interposed in an electric circuit of the lure whereby operation of the audible means of the lure will occur intermittently depending upon the position of the lure in the water and upon its movement.

A further object of the invention is to provide a lure which can be readily used to attract fish by sound at night or in muddy or turbulent waters where the lure would not be readily seen.

Various other objects and advantages of the invention will hereinafter become more fully apparent from the following description of the drawing, illustrating a presently preferred embodiment thereof, and wherein:

Figure 1 is a side elevational view, partly broken away, of the fish lure;

Figure 2 is an enlarged longitudinal sectional view thereof taken substantially along a plane as indicated by the line 2—2 of Figure 1;

Figures 3 and 4 are cross sectional views of the lure, taken substantially along planes as indicated by the lines 3—3 and 4—4, respectively, of Figure 2, and Figure 5 is a diagrammatic view of the electric circuit of the lure.

Referring more specifically to the drawing, the sound producing fish lure in its entirety and comprising the invention is designated generally 7 and includes an elongated hollow body member, designated generally 8, which is preferably of circular cross section and which includes a rear portion 9 and a forward portion 10. The forward portion 10 is preferably larger in cross section than the rear portion 9, as best seen in Figure 2. The body portions 9 and 10 are separated from one another by a partition wall 11, which is located at the forward end of the body portion 9 and which is formed of an electrical insulating material and is immovably disposed in the body 8.

The rear body portion 9 provides a barrel which is adapted to contain a conventional dry cell battery 12. The rear end of the rear section 9 is closed by a cap 13 which is threadedly connected as seen at 14 to the rear end of the body portion 9. A sealing gasket 15 provides a liquid tight seal at the threaded joint 14. A spring 16 is contained in the cap 13 and bears against the rear end of the battery 12 to provide an electrical connection between the base contact of the battery and the cap 13 and for urging the battery 12 forwardly of the body portion 9 to yieldably maintain the forward battery contact 17 in electrical contact with a contact element 18 which is mounted in and extends through the wall 11.

A pair of supporting brackets 19 and 20 are secured to and project from the forward side of the partition 11 and support the sealed cartridge 21 of a mercury type electric switch 22 in which is disposed a mass of mercury 23. A conductor wire 24 is connected to the contact 18 and extends into the cartridge 21 near its forward end 25. Another conductor wire 26 has one end extending into the forward portion of the cartridge 21 and disposed in spaced apart relation to the conductor wire 24. The cartridge 21 is composed of electrical insulating material for insulating the conductor wires 24 and 26 from one another. The cartridge 21 is disposed in substantially a horizontal plane in the normal position of the lure 7, as seen in Figure 1, with the longitudinal axis of said cartridge 21 disposed nearly crosswise to the longitudinal axis of the lure 7 but inclined slightly so that the forward end 25 of the cartridge is disposed somewhat forwardly of the other end thereof, as best illustrated in Figure 2.

An electromagnet 27 is supported within the forward body portion 10 by a pair of discs 28 and 29 of electrical insulating material. A plurality, preferably three stops 30 are secured within the body portion 10 and provide abutments against which the rear side of the rear disc 28 abuts. The rear side of the forward disc 29 also abuts against a plurality, preferably three abutments 31. Screw fastenings 32 extend through the front disc 29 and threadedly engage in the abutments 31 for securing the discs 28 and 29 and the electromagnet 27 supported thereby within the body portion 10. As seen in Figure 3, the rear disc 28 has openings 33 which may pass the abutments 31 so that said rear disc can be positioned against the rear abutments 30. A supporting bar 34 has one end secured against the rear side of the partition 28 and an opposite end which extends forwardly through a notch 35 of said partition 28. The electromagnet 27 includes a winding 36 one end of which is connected to the conductor wire 26 and the other end of which is connected to the bar 34 by a conductor wire 37. The bar 34 is formed of an electrical conducting material. The conductor wires 26 and 37 extend through openings 38 of the disc 28, as best seen in Figure 3.

A vibrating armature 39, formed preferably of a strip of spring steel, has one end secured by a fastening 40 to the forward end of the bar 34, which extends forwardly from the disc 28. The armature 39 extends forwardly from the bar 34 through a notch 41 in the forward disc 29. The armature 39 has an opposite free end 42 which extends transversely across a portion of the forward side of the disc 29 and which is spaced therefrom. The electromagnet 27 also includes a core 43 which extends through the winding 36 and which has a forward end extending through the central portion of the disc 29 and which is normally spaced from the free end 42 of the armature 39.

The forward end of the forward body portion 10 is closed and sealed by a metal diaphragm 44 which is preferably formed of bronze. The peripheral edge of the diaphragm 44 is joined to the forward end of the body portion 10 at the joint of said forward end of the body portion with a forwardly tapered nose 45 of the lure 7, and which joint of the parts 10, 44 and 45, as seen at 46, may be formed by welding or in any other suitable manner, so as to nondetachably connect the parts together and so that the diaphragm 44 will effectively seal the forward end of the body portion 10. The diaphragm 44 is preferably substantially conical in shape and extends inwardly toward the armature end 42 and has a centrally disposed contact element 47 fixed to the inner side thereof and in opposed relation to the contact point 48 which is fixed to the outer side of the armature portion 42. Said armature portion 42 is spring biased by the resiliency thereof outwardly or forwardly away from the electromagnet 27 and toward the diaphragm 44, so that the contact point 48 is normally disposed against the contact point 47.

The body portion 8 is formed of an electrical conducting material which completes the electric circuit from the diaphragm 44 back to the base end of the battery 12 through said body portion 8, the cap 13 and spring 16, as illustrated diagrammatically in Figure 5. The electromagnet 27, the armature 39 and the diaphragm 44 form a relay. When the mercury 23 is in contact with and bridging the gap between the conductor wires 24 and 26, current will flow through the closed circuit as illustrated in Figure 5. Current passing through the coil 36 will magnetize the core 43 which will attract the armature end 42, causing said end to swing rearwardly or to the left as seen in Figure 2 toward the core 43 and away from the contact 47. When this occurs, the circuit is broken. When the core 43 is thus demagnetized, the resiliency of the armature portion 42 will cause it to swing rapidly forward or to the right so that the contact 48 thereof will forcibly strike the contact 47 to again effect a closing of the circuit, assuming that the mercury 23 is still in engagement with the conductors 24 and 26. The nose 45 is provided with a plurality of perforations 49 so that the interior of the nose 45 is filled with water when the lure 7 is submerged. Thus, the armature contact 48 in striking the contact 47 of the sounding diaphragm 44, which diaphragm is in direct contact with the water, will produce a buzzing sound which will be readily audible for attracting fish.

The lure 7 is non-buoyant and constitutes a subsurface lure. The diaphragm 44 is conical in shape so that pressure of the water against the outer side thereof, when the lure is at a depth of more than several feet, will not be sufficient to adversely affect the vibration of said diaphragm and the sounds produced thereby. The diaphragm 44 may be otherwise dished, than as illustrated, for accomplishing this result or could be made flat if the lure was constructed for use as a surface lure.

The inertia responsive switch 22 will cause the sounding mechanism to be operated intermittently, thus more realistically simulating the sounds produced by natural bait on which fish feed, and also effecting a substantial saving in the amount of current consumed. For example, when the lure wobbles so as to rock or turn counterclockwise, as seen in Figure 3, the mercury 23 will flow toward the rear end of the capsule 21, away from the forward end 25 and out of contact with the conductors 24 and 26, as seen in Figure 2, for breaking the electric circuit between the battery 12 and the electromagnet 27. When the lure 7 wobbles in the opposite direction so as to turn clockwise as seen in Figure 3, the mercury 23 will flow toward the forward end 25 of the capsule to bridge the conductors 24 and 26 to complete the electric circuit between the battery 12 and electromagnet 27. Likewise, when the lure is being pulled forward on retrieving from left to right of Figure 2, due to the angular disposition of the capsule 21 relative to the longitudinal axis of the lure 7, inertia of the mass 23 will cause it to move away from the contacts 24 and 26 to open the switch 22. In a like manner, when the forward motion of the lure is decelerated the mercury mass will be impelled by inertia back into engagement with the contacts 24 and 26 to close the switch 22. Thus, operation of the sounding mechanism can be controlled in part by the fisherman and will be intermittent. When the lure is being withdrawn from the water and thereafter, it can be held in an upright position with the nose 45 at the top thereof to maintain the switch 22 in an open position.

The underside of the lure body 8 is provided with longitudinally spaced depending eyelets 50 to which fishhooks, not shown, are adapted to be connected, and said underside is also provided with a downwardly and forwardly extending deflector blade 51 for causing the lure 7 to nose down when drawn forwardly through the water. The parts 50 and 51 will prevent rotation of the lure about its longitudinal axis when in use so that the capsule 21 will normally be disposed in substantially a horizontal plane. A line attaching eye 52 is attached to and extends from the forward end of the nose 45, and is adapted to have a fishing line or leader attached thereto.

Various modifications and changes are contemplated and may obviously be resorted to, without departing from the spirit or scope of the invention as hereinafter defined by the appended claims.

I claim as my invention:

1. A fish lure comprising an elongated hollow lure body, a self-contained current source disposed in said lure body, a relay mounted in said lure body, and an electric circuit including said current source and relay, a sounding diaphragm forming a part of said relay having an outer side adapted to be disposed in contact with water surrounding the lure, an armature forming a part of said relay and attracted, when the relay is energized, away from said diaphragm to break the electric circuit to release said armature for movement forcibly back into engagement with the diaphragm, inertia responsive switch means interposed in said electric circuit, and means supporting said inertia responsive switch means in the lure body in substantially a horizontal plane and at an angle slightly less than a right angle relative to the axis of the lure body whereby the inertia responsive switch means is responsive to a wobbling and rocking motion and also to acceleration and deceleration of the lure for opening and closing said electric circuit.

2. A fish lure comprising an elongated hollow lure body, a self-contained current source disposed in said lure body, a relay mounted in said lure body, and an electric circuit including said current source and relay, a sounding diaphragm forming a part of said relay, an armature forming a part of said relay and attracted, when the relay is energized, away from said diaphragm to break the electric circuit to release said armature for movement forcibly back into engagement with the diaphragm, said diaphragm forming a wall portion of the hollow lure body, said lure including a perforated tapered nose extending outwardly from the sounding diaphragm and providing a hollow chamber in combination with said diaphragm adapted to be filled with water.

3. A fish lure as in claim 2, and a partition formed of electrical insulating material having a conductor element extending therethrough and forming a part of said electric circuit, said partition cooperating with a part of the lure body including said diaphragm to define a sealed chamber containing the armature of said relay.

4. A fish lure comprising an elongated lure body, a self-contained current source disposed in said lure body, a relay mounted in said lure body, and an electric circuit including said current source and relay, a sounding diaphragm forming a part of said relay and having an outer side adapted to be disposed in contact with water surrounding the lure, an armature forming a part of said relay and attracted, when the relay is energized, away from said diaphragm to break the electric circuit to release said armature for movement forcibly back into engagement with the diaphragm, said diaphragm being inwardly dished relative to the lure body to minimize the dampening effect of the pressure of the water against the outer side thereof.

References Cited in the file of this patent

UNITED STATES PATENTS

| Number | Name | Date |
|---|---|---|
| 1,305,352 | Gettell | June 3, 1919 |
| 2,431,091 | Thomas | Nov. 18, 1947 |
| 2,545,808 | Du Pree | Mar. 20, 1951 |
| 2,577,229 | Carnes | Dec. 4, 1951 |
| 2,598,471 | Waite | May 27, 1952 |